United States Patent Office 3,553,124
Patented Jan. 5, 1971

3,553,124
COATING COMPOSITIONS COMPRISING ACRYLIC POLYMERS CONTAINING AN OXAZOLINE DRYING OIL CONSTITUENT
James M. Donatello, Wilmington, Del., and Aloysius N. Walus, Flint, Mich., assignors to E. I. du Pont de Nemours and Company, Wilmington, Del., a corporation of Delaware
No Drawing. Continuation-in-part of application Ser. No. 491,815, Sept. 30, 1965. This application Aug. 23, 1968, Ser. No. 754,979
Int. Cl. C08f 7/12; C09d 3/00
U.S. Cl. 260—23                                  1 Claim

ABSTRACT OF THE DISCLOSURE

A coating composition in which the film-forming polymer consists essentially of:
(1) 30 to 70% by weight of methyl methacrylate,
(2) less than 35% by weight of an ester of acrylic or methacrylic acid of a $C_2$ to $C_{12}$ saturated aliphatic monohydric alcohol,
(3) less than 10% by weight of acrylonitrile, and
(4) 15 to 35% by weight of an oxazoline drying oil constituent.

CROSS REFERENCE TO RELATED APPLICATIONS

This application is a continuation-in-part of application Ser. No. 491,815, filed Sept. 30, 1965, now Pat. No. 3,488,307.

BACKGROUND OF THE INVENTION

This invention relates to a novel polymeric coating composition which can be applied to a variety of substrates and which can be formed into a pigment base which is readily blended with an acrylic polymer or another polymer to form a pigmented polymeric coating composition that is useful primarily in refinishing of thermosetting enamel paints and in particular refinishing of acrylic enamel paints.

Methacrylate coating compositions are well known in the art as shown by Crissey and Lowell Pats. 2,934,509 and 2,934,510, both issued on Apr. 26, 1960. Processes for forming polymer containing oxazoline drying oils are disclosed in Miranda et al. U.S. 3,208,981, issued Sept. 28, 1965, and Purcell, U.S. 3,248,397, issued Apr. 26, 1966. The coating compositions of these prior art patents are excellent for many uses, but the novel coating composition of this invention has the necessary balance of properties which allows pigmentation with a wide variety of pigments and which permits blending of the pigmented composition with a variety of other coating compositions, e.g., acrylic polymers, iminated acrylic polymers, cellulose acetate butyrate and the like.

One particular problem that existed prior to this invention was the difficulty encountered when repairing a thermosetting enamel coating on a metallic substrate which is used on a variety of automobiles manufactured today. Previously, repair of these enamel coatings required roughening of the enamel coat followed by a primer and/or a sealer coat before a repair coat of either an enamel or a lacquer was applied. Moreover, in order to obtain an unnoticeable repair, the entire panel usually had to be refinished. Another method for repairing thermosetting enamels comprised using a nitrocellulose based lacquer which adhered tenaciously to a roughened enamel substrate without using a primer or a sealer coat, but the nitrocellulose repair coating deteriorated quite rapidly upon weathering which made the refinished area noticeable after only a few months exposure.

The novel coating composition of this invention when blended with an acrylic polymer, particularly an iminated acrylic polymer, as disclosed, for example, in McDowell et al. U.S. 3,309,331, issued Mar. 14, 1967, and Christenson et al. U.S. 3,290,416, issued Dec. 12, 1966, provides excellent adhesion to thermosetting enamel substrates without first priming or sealing the surface of the enamel and also has excellent resistance to cracking and good outdoor durability.

SUMMARY OF THE INVENTION

The novel coating composition of this invention has as the film-forming component an interpolymer which consists essentially of:

(1) 30 to 70% by weight based on the weight of interpolymer of methyl methacrylate units,
(2) less than about 35% by weight of ester units of an $\alpha,\beta$-unsaturated monocarboxylic acid and $C_2$ to $C_{12}$ saturated aliphatic monohydric alcohol,
(3) less than about 10% by weight acrylonitrile units, and
(4) 15 to 35% by weight of units of a compound having the following structural formula:

FORMULA 1

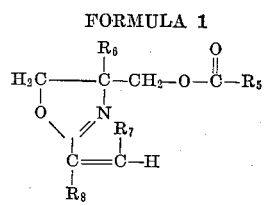

in which $R_5$ is a $C_3$ to $C_{21}$ hydrocarbon group of a saturated or unsaturated fatty acid, $R_6$ is H, $C_1$ to $C_4$ alkyl group or

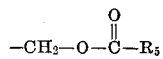

$R_7$ is H, or a $C_1$ to $C_4$ alkyl group and $R_8$ is a $C_2$ to $C_{20}$ hydrocarbon group of a saturated or unsaturated fatty acid.

DESCRIPTION OF THE INVENTION

The interpolymer of the novel coating composition is prepared by conventional methods of solution polymerization of monomeric units of about:

(1) 30 to 70% by weight methyl methacrylate (MMA),
(2) less than about 35% by weight of an ester of an $\alpha,\beta$-unsaturated carboxylic acid and a $C_2$ to $C_{12}$ saturated monohydric alcohol, preferred are esters of acrylic and methacrylic acid, such as ethyl acrylate, propyl acrylate, butyl acrylate, 2-ethylhexyl acrylate, lauryl acrylate, ethyl methacrylate, propyl methacrylate, butyl methacrylate, octyl methacrylate, lauryl methacrylate and the like, the particularly preferred ester being ethyl acrylate (EA),
(3) less than about 10% by weight of acrylonitrile (AN), and
(4) 15 to 35% by weight of a compound as previously defined by the structural Formula 1.

In its preferred form, the interpolymer consists of about 53 to 57% by weight methyl methacrylate, 13 to 17% ethyl acrylate, 3 to 7% acrylonitrile and 23 to 27% of a reaction product of 1 mole of tris-(hydroxymethyl)-aminomethane and 3 moles of tall oil fatty acid which is subsequently reacted with formaldehyde. This oxazoline drying oil is described in Purcell U.S. Pat. 3,248,397, issued Apr. 26, 1966, which is hereby incorporated by reference. The compound is currently sold under the trademark of "Chemacoil TA 100." In relating the structural Formula 1 to the above reaction product, $R_5$ is the hydrocarbon group of tall oil fatty acid, $R_8$ is the hydrocarbon group of a tall oil fatty acid less the —$CH_2$— group, which is adjacent to the carboxyl group of the acid, $R_6$ is

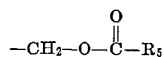

and $R_7$ is H.

Up to 15% by weight of units of styrene can be substituted for part or all of the (2) constituent of the interpolymer without adversely affecting the properties of the coating composition.

A coating composition is formulated from the interpolymer and, preferably, is pigmented and then can be subsequently diluted with solvents to form a lacquer composition or can be blended with other polymers to form a coating composition.

The coating composition of this invention is preferably pigmented to pigment volume concentration of about 1 to 50% and preferably about 1 to 20%. The term "pigment volume concentration" is the ratio expressed on a percentage basis of the volume of the pigment relative to the total volume of the non-volatile content of the coating composition including the organic film-forming materials and pigment.

A wide variety of pigments can be used with the only requirement being that the pigment used does not react with the film-forming polymer. Following are some typically useful pigments: magnesium silicate, zinc oxide, barytes, silica, zinc dust, aluminum (finely divided flakes and powder), titanium dioxide, Wollastonite, carbon black, monastral red, monastral blue, indo blue, chrome yellow, monastral green, copper bronze, green gold, iron oxides and the like.

The following solvents or mixtures thereof are useful for forming a coating composition from a pigmented film-forming polymer of this invention: acetone, methylethyl ketone, amyl alcohol, "Cellosolve" acetate, ethyl acetate (denaturated), ethyl alchol (denaturated), isopropanol, ethylene dichloride, butyl lactate, diacetone alcohol, diisobutyl ketone, cyclohexanone, amyl acetate, butyl "Cellosolve," cyclohexanol, methyl acetate, furfural, petroleum naphtha, toluene, cyclohexane, benzene, substituted benzene, substituted toluene, hexane, toluene-type hydrocarbon, aromatic hydrocarbons, high boiling petroleum naphtha, xylene, high solvency petroleum hydrocarbon, diethyl ether, methyl amyl acetate, and butanol. Useful lacquer compositions contains about 90 to 50% by weight organic solvent and 10 to 50% by weight of the film-forming polymer.

A particularly preferred solvent consists of 38% by weight of a mixture of hexane and acetone, 52% by weight of a mixture of isopropyl alcohol, xylene, toluene, butyl alcohol, and 10% by weight of a mixture of methyl-amyl acetate and Cellosolve acetate.

The coating composition of this invention can be applied to a variety of substrates, such as, metal, wood, plastic, by conventional techniques such as brushing, spraying, electrostatic spraying, dip coating, flow coating and the like. After application, the novel composition can be air dried or baked, for example, at 220° F. (105° C.) for about 20–30 minutes.

The novel coating composition of this invention has several particular advantages which makes the novel composition particularly useful for blending with other polymer compositions. The composition of this invention is readily pigmented with many, if not all, pigments and the pigmented composition is readily compatible with many polymers, particularly acrylic polymer, cellulose acetate butyrate and the like.

One preferred acrylic polymer that can be blended with the novel coating composition of this invention is formed by first preparing a carboxylic polymer by conventional methods of solution polymerization containing units of about:

(1) 75% to 95% by weight methyl methacrylate (MMA),
(2) less than about 20% by weight of an ester of an $\alpha,\beta$-unsaturated carboxylic acid and a $C_2$ to $C_{12}$ saturated aliphatic monohydric alcohol, preferred are esters of acrylic acid and methacrylic acid, such as ethylacrylate, propylacrylate, butylacrylate, 2-ethylhexyl acrylate, lauryl acrylate, ethyl methacrylate, butyl methacrylate, octyl methacrylate, lauryl methacrylate and the like; one particularly preferred ester is ethyl acrylate (EA),
(3) 1.5 to 15% by weight of an $\alpha,\beta$-unsaturated carboxylic acid such as methacrylic acid, acrylic acid, crotonic acid, maleic acid, fumaric acid, itaconic acid and the like, with methacrylic acid being the preferred constituent.

The carboxylic polymer is then reacted with an aziridine compound, which is often referred to as an alkylene imine, of the following structural formula:

FORMULA 2

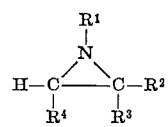

wherein $R^1$, $R^2$, $R^3$ and $R^4$ are as defined in Formula 1.

Ethylenimine (Formula 3) and 1,2-propylenimine (Formula 4) as shown hereinafter are particularly preferred aziridines because of their relatively low cost and plentiful supply and because they tend to provide the final product with excellent adhesive properties.

FORMULA 3

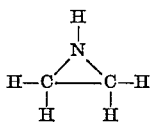

FORMULA 4

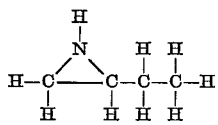

The alkylene imine reacts with the acid group of the polymer chain to form pendent monovalent amino-ester radicals.

One preferred acrylic polymer of this type is composed of about 78 to 82% by weight methyl methacrylate, 12 to 14% by weight ethyl acrylate, and 5 to 8% by weight of monovalent amino ester radicals attached to the polymer backbone. The amino ester radicals are the reaction products of the carboxyl groups of methacrylic acid and either propylenimine or ethylenimine and have the formula:

FORMULA 5

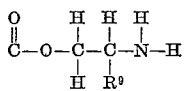

in which $R^9$ is either H or methyl.

Another preferred acrylic polymer which can be blended with the novel coating composition of this invention consists of about 80% by weight methyl methylacrylate, 13% by weight ethyl acrylate and 7% by weight of the aminoester of methacrylic acid and propylenimine.

The aforementioned blend of the iminated acrylic polymer and the novel coating composition of this invention adheres quite well to either buffed or weathered enamel surfaces, but preferably, the surface is buffed before the coating is applied. If this coating composition blend is to be applied over a new or an unweathered enamel, buffing is essential for good adhesion. As above, the coating blend can be applied by conventional techniques and after application, the coating can be air dried or baked.

Another novel feature of the aforementioned coating compositions blends is that after the dried coating is exposed to ultraviolet light, for example, sunlight, for about two weeks, the polymer cross-links and becomes insoluble in solvents which are used to apply the coating and also become more resistant to cracking upon weathering. The composition blend before exposure to ultraviolet light acts as a conventional lacquer but after exposure, it has the characteristics of an enamel. This and the other desirable characteristics of the coating composition blend make it useful not only for repair and refinishing of enamels, and in particular acrylic enamels, but also as a suitable composition for repairing all types of coated metal substrates, such as metals coated with acrylic lacquers, nitrocellulose lacquers, alkyd-melamine paints and the like. Furthermore, this composition blend can be used as the primary topcoat on suitably primed metal substrates.

The examples illustrate the invention. All quantities shown are on a weight basis unless otherwise indicated.

EXAMPLE 1

A coating composition was prepared by formulating two interpolymers A and B having the following compositions:

Interpolymer A

A polymer was formed of methyl methacrylate/ethyl acrylate/methacrylic acid in a weight ratio of 80/13/7, this polymer was subsequently treated with propylenimine to form pendent aminoester groups on the polymer backbone.

Interpolymer B

A polymer was formed of methyl methacrylate/ethyl acrylate/acrylonitrile/"Chemacoil TA−100" (described hereinafter) in a weight ratio of 55/15/5/25.

Preparation of interpolymer A MMA/EA/MMA-Propylene imine

| | Parts by wt. |
|---|---|
| Portion 1: | |
| Toluene | 1725.0 |
| Anhydrous isopropyl alcohol | 1145.0 |
| Ethyl acetate | 843.0 |
| Portion 2: | |
| Methyl methacrylate monomer | 2445.0 |
| Azobisisobutyronitrile | 9.0 |
| Ethyl acrylate monomer | 397.0 |
| Methacrylic acid | 214.0 |
| Portion 3: | |
| Azobisisobutyronitrile | 9.0 |
| Ethyl acetate | 30.0 |
| Portion 4: | |
| Azobisisobutyronitrile | 10.0 |
| Ethyl acetate | 30.0 |
| Portion 5: | |
| Ethyl acetate | 724.0 |
| Portion 6: | |
| Propylenimine | 176.0 |
| Anhydrous isopropyl alcohol | 183.0 |
| Portion 7: | |
| Anhydrous isopropyl alcohol | 77.0 |
| Total | 8017.0 |

Each of the monomers was of the ordinary commercially available inhibited grade which contains a small amount of inhibitor, such as the methyl ether of hydroquinone.

The multi-component proportions were premixed before they were added. Portion 1 was charged into a conventional polymerization vessel equipped with a stirrer, thermometer and means to introduce reagents, and means of heating and cooling the reaction mixture and was heated to its reflux temperature of about 80 to 83° C. Portion 2 was premixed just before it was added since it was not stable and was added continuously over a 2 hour period to the reaction vessel while maintaining the temperature of the ingredients at about 80° C. After Portion 2 was added, the reaction mixture was held at this temperature for about 2 hours. Portion 3 was then added with constant agitation while the temperature of the reaction mixture was maintained at about 80° C. and the mixture was held at this temperature for about one hour. Portion 4 was slowly added with constant stirring and Portion 5 was then added while the temperature of the reaction mixture was held at about 70° C. until a Gardner Holt viscosity of $Z_2$–$Z_4$ was reached. Next Portion 6 was slowly added with constant agitation, then Portion 7 was added and the reaction mixture was held at about 77° C. until the acid number of the mixture reached about 1 or below. The resulting reaction mixture which had about a 40% solids content was cooled to room temperature and filtered to remove coagulum formed during the reaction.

Preparation of interpolymer B MMA/EA/AN/ "Chemacoil" TA–100

| | Parts by wt. |
|---|---|
| Portion 1: | |
| Methyl amyl acetate | 102.30 |
| Xylol | 152.00 |
| Portion 2: | |
| Methyl methacrylate monomer | 224.80 |
| "Chemacoil" TA–100 (reaction product of one mole of tris-(hydroxymethyl)-aminomethane with 3 mols of tall oil fatty acid which is subsequently reacted with one mol of formaldehyde using the process of Example 1 of U.S.P. 3,248,397, issued Apr. 26, 1966) | 102.20 |
| Cellosolve acetate | 74.10 |
| Dicumyl peroxide | 4.10 |
| Acrylonitrile | 20.50 |
| Ethyl acrylate monomer | 61.30 |
| Di-tertiary-butyl peroxide | 6.20 |
| Portion 3: | |
| Toluene | 74.10 |
| Total | 821.60 |

The multi-component portions were premixed before they were added. Portion 1 was charged into a conventional polymerization vessel equipped with stirrer, thermometer and means to introduce the reagents, and means of heating and cooling the reaction mixture and was heated with agitation to its reflux temperature which was about 132° C. to 135° C. Portion 2 was premixed only a short time before it was added since it was not stable and was added at an even and continuous rate over a 5-hour period with constant agitation while maintaining a reflux temperature of about 132 to 133° C. The mixture was held at its reflux temperature until a conversion of about 53.5% polymer solids was reached and a constant viscosity was obtained between $Z_2$–$Z_4$ Gardner Holt viscosity. The mixture was then cooled to room temperature and Portion 3 was added. The resulting mixture which has a solids content of about 50% was filtered to remove coagulum that has formed during the reaction.

An acrylic lacquer was then formulated by forming a pigment dispersion, mixing this dispersion with the blend of Polymers A and B and diluting this mixture to a spray viscosity with solvents.

Formula Y Pigment dispersion

| | Parts by wt. |
|---|---|
| Interpolymer B solution (50% solids) | 188 |
| Titanium dioxide pigment | 580 |
| Acetone | 77 |
| Toluene | 129 |
| Cellosolve acetate | 26 |
| Total | 1000 |

The ingredients were premixed and charged into a conventional sand-grinding mill and ground to about a 0.3 mil fineness.

The acrylic lacquer was formed by mixing the following ingredients:

| | Parts by wt. |
|---|---|
| Formula Y Pigment dispersion | 344.7 |
| Interpolymer A solution (40% solids) | 323.5 |
| Interpolymer B solution (50% solids) | 146.8 |
| Acetone | 72.0 |
| Hexane | 113.0 |
| Total | 1000.0 |

A coat of the acrylic lacquer about 2 mils in thickness was sprayed onto each of the following sets of panels (15 panels per set) and air dried: autobody steel panels which had been suitably primed; steel panels coated with acrylic lacquer; steel panels coated with a pigmented nitrocellulose lacquer; steel panels coated with a thermosetting acrylic enamel; steel panels coated with an alkyd enamel; steel panels coated with an alkyd-melamine enamel; the surface of the thermosetting acrylic enamel, the alkyd enamel and the alkyd-melamine enamel were machine buffed with a conventional buffing compound before the acrylic lacquer was applied.

The initial appearance of each of these sets of panels and adhesion of the lacquer to the various substrates was excellent.

Five panels of each of the above sets were subjected to a high-humidity-low temperature crack test which consisted of 24 cycles. In each cycle, the panels were subjected to (1) 100% relative humidity and 100° F. for 24 hours, (2) −10° F. for 24 hours and (3) room temperature for 4 hours. At the completion of each cycle, the panels were examined with a magnifying glass for cracks. At the end of the test, many of the above panels showed no cracking, while several had some slight insignificant cracks.

Ten panels of each of the sets were exposed in Florida at a 45° angle facing south. The panels were examined after 6 months and 12 months. After 12 months of weathering, each of the panels showed good color retention, excellent gloss, very little chalking and water spotting, and no loss of adhesion to the substrate.

Both the high humidity-cold crack test and the outdoor exposure test indicate that the novel acrylic lacquer composition of this invention is an excellent primary coating for metals and adheres well to all types of thermosetting enamel substrates even under severe testing conditions.

EXAMPLE 2

A nitrocellulose lacquer coating was compared to the acrylic lacquer of Example 1 for outdoor durability. A nitrocellulose lacquer having the same pigment and pigment volume concentration as the acrylic lacquer of Example 1 was formulated by mixing the following ingredients:

| | Percent solids |
|---|---|
| Nitrocellulose (⅛ to ⅜ sec. Saybolt viscosity solution of a ketone solvent) | 52 |
| Coconut oil modified glycerol phthalate resin (50% solids solution in which the solvent is a mixture of xylene and toluene) | 22 |
| Di-butyl phthalate | 15 |
| Air blown castor oil | 11 |
| Total | 100 |

The resulting composition had a solids content of about 45%. A pigment dispersion was then formed according to Formula Y Pigment Dispersion of Example 1 with the exception that the above nitrocellulose solution was substituted for the Interpolymer B solution. This pigment dispersion was then mixed with the above nitrocellulose composition according to the procedure of Example 1 to form a pigmented nitrocellulose lacquer.

Four sets (10 panels per set) of suitable primed steel panels were prepared and each set was coated with a different commercially available thermosetting acrylic paint. The following thermosetting acrylic paints were used: Du Pont, Cook, Jones-Dabney and Dizler. Each of the acrylic paint surfaces was first buffed. About a 2 mil coat of the acrylic lacquer of Example 1 was sprayed on 5 panels of each set and air dried. A 2 mil coat of the above prepared nitrocellulose lacquer was sprayed on the remaining 5 panels of each set and air dried. Both the nitrocellulose lacquer coated panels and the acrylic lacquer coated panels had a good appearance and both lacquers had excellent adhesion to the acrylic paint substrate.

All of the panels are then exposed out of doors in Florida at a 45° angle facing south. After 2 months, each panel was checked for appearance and adhesion of the topcoat to the acrylic paint. The results of the test (average of 5 panels) are as follows:

|  | Adhesion/appearance | |
| --- | --- | --- |
|  | Example 1 acrylic lacquer | Nitrocellulose lacquer |
| Acrylic thermosetting paint: | | |
| Du Pont | 10/Excellent | 5/Chalked. |
| Cook | 10/Excellent | 0/(*). |
| Jones-Dabney | 10/Excellent | 5/Chalked. |
| Dizler | 10/Excellent | 7/Chalked. |

*No lacquer remained on the panels.
NOTE: Adhesion rating: 10=Excellent adhesion; 0=No adhesion.

The above test illustrates the superiority of adhesion and appearance of the acrylic lacquer composition of this invention in comparison to conventional nitrocellulose lacquers which are frequently used to repair acrylic paints.

EXAMPLE 3

A conventional acrylic lacquer was compared to the novel lacquer composition of Example 1 for adhesion to a buffed but unprimed substrate of a thermosetting acrylic paint.

A conventional acrylic lacquer was formulated by combining the following ingredients:

| | Parts by wt. |
| --- | --- |
| Methyl methacrylate solution (40% solids) | 101 |
| Cellulose acetate butyrate (25% solids) | 120 |
| Butyl cyclohexanol phthalate | 11 |
| Coconut oil modified glycerol phthalate (70% solids) | 18 |
| Total | 250 |

The resulting polymer solution had a solids content of about 45%.

A pigment dispersion was formulated which was the same as Formula Y Pigment Dispersion of Example 1 except an equivalent amount of the aforementioned methyl methacrylate solution was substituted for the Interpolymer B solution of Example 1. An acrylic lacquer was then formulated according to Example 1 except the above prepared pigment dispersion and polymer solution were used.

Ten steel panels were primed and coated with a thermosetting acrylic enamel paint and the coating was buffed. A 2 mil thick coat of the acrylic lacquer composition of Example 1 was applied to 5 of the panels and allowed to air dry. Similarly, a 2 mil thick coating of the above conventional acrylic lacquer was applied to the remaining 5 panels and air dried.

After 72 hours, each of the panels was checked for adhesion of the topcoat. The adhesion test involved cutting diamond shapes on the paint in which the cut penetrated the paint film to the metal, then a piece of tape was placed over the cut area and smoothed down. The tape was then removed. If none of the topcoat was removed, the adhesion of the lacquer was considered excellent. Each of the panels coated with the acrylic lacquer composition of Example 1 had excellent adhesion to the acrylic paint while the conventional acrylic lacquer readily peeled off the acrylic enamel.

EXAMPLE 4

The following acrylic lacquers were prepared according to Example 1 using the Formula Y Pigment Dispersion with the exception that the polymer proportions as indicated were used to form the lacquer:

POLYMER PROPORTIONS

| Acrylic lacquer 1: | Parts by weight |
| --- | --- |
| Interpolymer A (Ex. 1) | 80 |
| Interpolymer B (Ex. 1) | 20 |
| Total | 100 |
| Acrylic lacquer 2: | |
| Interpolymer A (Ex. 1) | 70 |
| Interpolymer B (Ex. 1) | 30 |
| Total | 100 |
| Acrylic lacquer 3: | |
| Interpolymer C | 80 |
| Interpolymer B (Ex. 1) | 20 |
| Total | 100 |

Interpolymer C was prepared using the procedure of Example 1 to form Interpolymer A, except methyl methacrylate/methacrylic acid in a weight ratio of 93/7 was used to form the polymer which was subsequently reacted with 4.64 parts by weight propylenimine.

| Acrylic layer 4: | Parts by weight |
| --- | --- |
| Interpolymer C | 60 |
| Interpolymer B (Ex. 1) | 40 |
| Total | 100 |
| Acrylic lacquer 5: | |
| Interpolymer C | 48 |
| Interpolymer B (Ex. 1) | 52 |
| Total | 100 |

A coating of about 2 mils of each of the above acrylic lacquers 1–5 was sprayed onto separate steel panels, each panel having a buffed acrylic paint coating and the acrylic lacquer was allowed to air dry. The initial appearance and adhesion of the lacquer was excellent. In each case, the results of the high humidity-low temperature crack test as described in Example 1 were similar to those obtained for the acrylic lacquer of Example 1. Also, each of the acrylic lacquer coatings showed excellent outdoor durability even after long periods of exposure.

EXAMPLE 5

An acrylic lacquer was prepared by first forming the following interpolymers:

Interpolymer C.—Prepared in Example 4
Interpolymer D.—Was prepared using the procedure of Example 1 to form Interpolymer B, except methyl methacrylate/"Chemacoil" TA–100 (described in Example 1) in a weight ratio of 70/30 was used to form the polymer.

A pigment dispersion was formulated which was the same as Formula Y Pigment Dispersion of Example 1 except that the above Interpolymer D was substituted for the Interpolymer B of Example 1. A lacquer was then formulated according to Example 1, except the above prepared pigment dispersion and interpolymers were used.

Five steel panels were primed and coated with a thermosetting acrylic enamel paint and the coating was buffed. A 2 mil coat of the above lacquer was applied and air dried. The initial appearance and adhesion of the lacquer was excellent. The results of the high humidity crack test as described in Example 1 were similar to those obtained for the acrylic lacquer of Example 1. Also, the lacquer

EXAMPLE 6

An acrylic lacquer was prepared by standard techniques by mixing together the following ingredients:

| | Parts by wt. |
|---|---|
| Iron blue pigment—an oxidized complex of ferric ferrocyanide | 154.00 |
| Interpolymer A (described in Example 1) | 153.00 |
| Interpolymer B (described in Example 1) | 131.00 |
| Interpolymer E (copolymer of methyl methacrylate/butylacrylate weight ratio 82/18) | 153.00 |
| Ethylene glycol monoethylether | 3.47 |
| Acetone | 63.29 |
| Toluene | 63.29 |
| Hexane | 43.23 |
| Total | 764.28 |

Five steel panels were primed and coated with a thermosetting acrylic enamel paint and the coating was buffed. A 2 mil coat of the above lacquer was applied and air dried. The initial appearance and adhesion of the lacquer was excellent. The results of the high humidity crack test as described in Example 1 were similar to those obtained for the acrylic lacquer of Example 1. Also, the lacquer showed excellent outdoor durability even after a long period of exposure.

EXAMPLE 7

An acrylic lacquer is formed by mixing together the following ingredients:

| | Parts by wt. |
|---|---|
| Formula Y Pigment Dispersion | 344.7 |
| Interpolymer B solution | 470.3 |
| Acetone | 72.0 |
| Hexane | 113.0 |
| Total | 1000.0 |

A coating about 2 mils thick of the above composition was sprayed onto 5 suitably primed steel panels and each panel was baked at 220° F. (105° C.) for about 20 to 30 minutes. The resulting coating on the panels had a good appearance and excellent adhesion to the primed substrate.

We claim:

1. A coating composition containing pigment in a pigment volume concentration of 1 to 20%, 10 to 50% by weight based on the weight of the coating composition of a film-forming polymer and complementary 90 to 50% by weight of an organic solvent mixture of non-polymerizable and non-reactive liquids; in which said film-forming polymer consists essentially of:

(1) 53 to 57% by weight based on the weight of the polymer of methyl methacrylate units,
(2) 13 to 17% by weight ethyl acrylate units,
(3) 3 to 7% by weight acrylonitrile units, and
(4) 23 to 27% by weight of units of a compound having the structural formula:

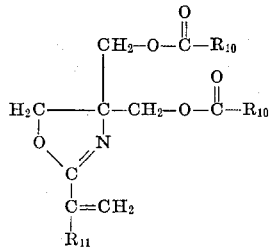

wherein $R_{10}$ is a hydrocarbon group of a tall oil fatty acid and $R_{11}$ is a hydrocarbon group of a tall oil fatty acid less a —$CH_2$— group.

References Cited

UNITED STATES PATENTS

| 3,036,976 | 5/1962 | Sanderson | 260—17 |
| 3,248,397 | 4/1966 | Purcell | 260—307 |
| 3,348,958 | 10/1967 | Cockerham et al. | 106—176 |

DONALD E. CZAJA, Primary Examiner

R. A. WHITE, Assistant Examiner

U.S. Cl. X.R.

117—75, 132, 161; 260—23.5, 32.8, 33.6, 41, 80.72, 307